Patented Sept. 20, 1932

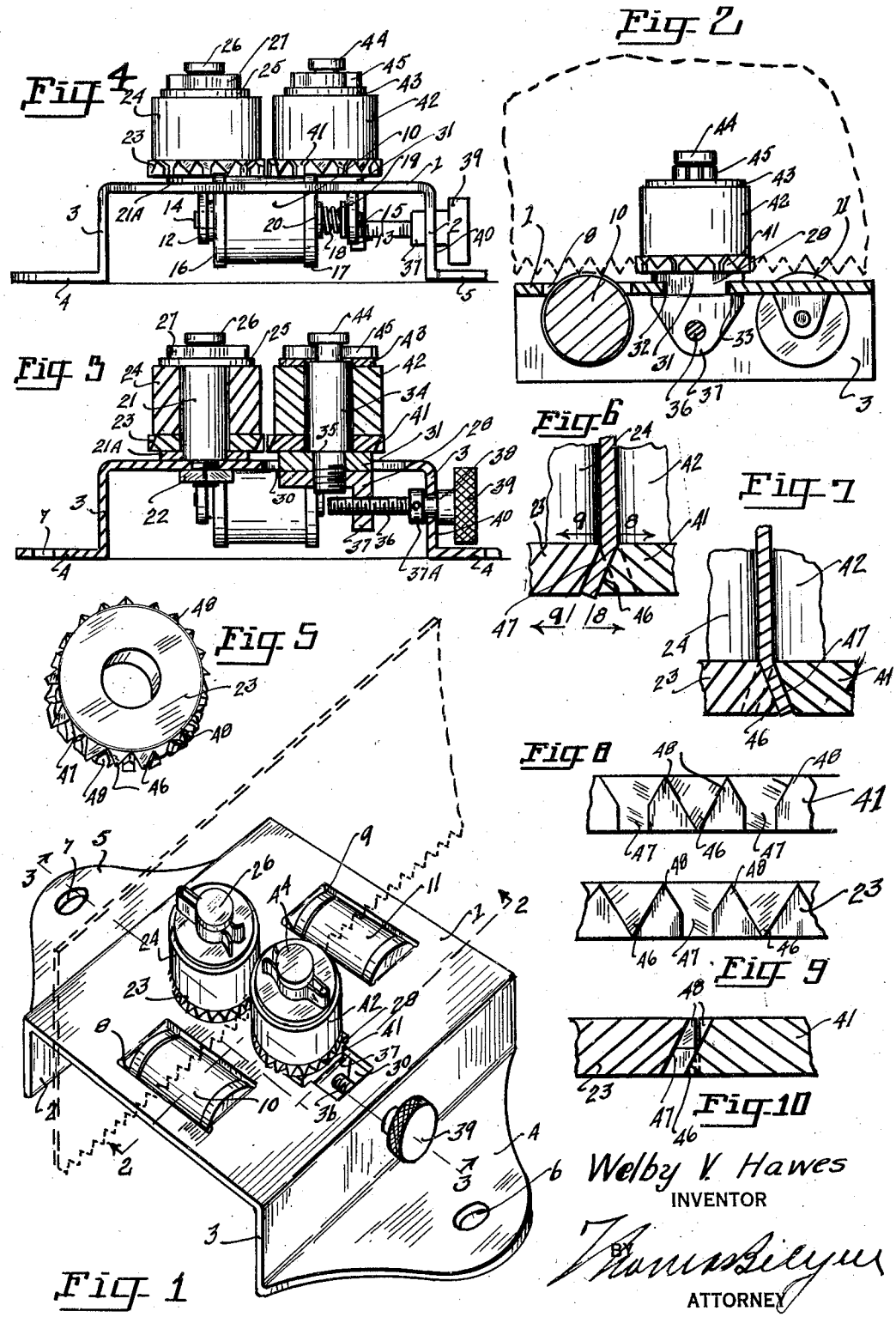

1,878,396

UNITED STATES PATENT OFFICE

WELBY V. HAWES, OF PORTLAND, OREGON

SAW SET

Application filed March 2, 1931. Serial No. 519,521.

My invention is intended for the setting of saws and is so arranged that the saw may be set by the pulling of the saw through the setting machine.

The invention in its preferred embodiment consists of a base or frame having a plurality of spaced rollers, removably disposed within the base and placed upon parallel axes, removably disposed within the frame.

A pair of alignment rollers are disposed upon parallel axes. One of the rollers is adapted for being moved to and away from the other of the rollers, in order to compensate for the difference in thickness of the saw blade and to maintain the saw blade in precise position and alignment.

A feeding and setting disc is positioned upon each of the axes, past which the saw to be set is drawn. In order to compensate for the difference in the spacing of the teeth, which is commonly called the number of points per inch of the saw, and for cross cut and rip saws, the setting and feeding discs are adapted for being easily and quickly changed. These feeding and setting discs are adapted for being placed in position and removed therefrom, with ease and facility, to adapt the device for the setting of saws of different thicknesses of blade and for the different shape of tooth encountered in cross cut saws and in rip saws.

One of the objects of my invention is to provide a saw set, through the use of which, a saw may be set by the pulling of the saw through the device.

A further object of my invention consists in the providing of a device for the setting of saws that require practically no mechanical skill in the use of the same.

A still further object of my invention consists in providing a simply constructed device, comprised of but few parts and one that may be used over relatively long operating periods, in which but little mechanical operating annoyances will be developed.

Still further objects of my invention consist in providing a device, having interchangeable parts and one that will not dull the saw in the setting of the same.

A further object of my invention consists in providing a set of feeding and setting discs, that will progress the saw accurately therethrough and precisely set each tooth with the same set, irrespective of the skill of the user of the same.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective, end view of the assembled device, illustrating a saw in dotted position therein and in position for being set.

Fig. 2 is a sectional, side view of the assembled device, the same being taken on line 2—2 of Fig. 1, looking in the direction indicated.

Fig. 3 is a sectional, end view, taken on line 3—3 of Fig. 1, looking in the direction indicated.

Fig. 4 is an end view of the assembled device.

Fig. 5 is a perspective, plan view of one of the feeding and setting wheels.

Fig. 6 is a fragmentary, sectional, end view of the saw blade and of the associated elements connected therewith and illustrating the set being formed in one of the teeth of the saw.

Fig. 7 is a similar view to that illustrated in Fig. 6, but in which the set in the adjacent tooth, or in the next tooth to be progressed thereinto, is shown as being set in the opposite direction.

Fig. 8 is a fragmentary, side view of one of the setting discs, the same being taken on line 8—8 of Fig. 6, looking in the direction indicated.

Fig. 9 is a fragmentary, sectional, side view of the disc, the same being taken on line 9—9 of Fig. 6, looking in the direction indicated.

Fig. 10 is a fragmentary, sectional, side view of the coacting discs, in which the saw blade is not shown, but the same are shown in position for feeding the saw blade, if and when, the same is drawn therethrough.

Like reference characters refer to like parts throughout the several views.

I preferably form the body 1 of my device of sheet or cast metal. Downwardly sloping side walls 2 and 3 are formed at opposite sides of the body element. Outwardly extending feet 4 and 5 are formed at the base of the side walls. The outwardly extending feet have holes 6 and 7 disposed therein through which fastening bolts are made to pass to secure the device in place and in position. The central portion of the body element is preferably made flat. Cutouts 8 and 9 are disposed in the oppositely disposed ends of the table surface through which rollers 10 and 11 upwardly extend.

The upper surface of the rollers 10 and 11 extend above the central portion of the body element, sufficiently to prevent the saw teeth from engaging the surface. The rollers are preferably made of nonmetallic material and may be obtained wherein these rollers are made from lignum vitae. Each of the rollers are removably disposed within supporting thimbles that are disposed upon each end of each of the rollers.

Ears 12 and 13 downwardly extend from the underside of the supporting surface and are formed integral therewith. The ears being spaced apart sufficiently to permit the rollers and the thimbles to be secured therein. Each of the thimbles have stub shafts 14 and 15 outwardly extending therefrom and each of the stub shafts are rotatably disposed relative to the ears 12 and 13 which form a journal for the stub shaft.

Referring to Fig. 4 the thimble 16 may be formed integral with the stub shaft 14 but the thimble 17 may be slidably disposed upon the shaft 15. A compressible element, as a coil spring 18 is disposed about the shaft 15, and reacts, upon its one end, against a collar 19 and upon its oppositely disposed end against the hub 20. Since the teeth of the saw are forcibly made to engage the rollers frequent changes of the same are necessary. When it is found necessary to change the rollers, it may be accomplished by compressing the coil spring 18 sufficiently to permit the roller to disengage from the supporting thimble elements; at which time a new one may be placed therein. A shoulder shaft 21 is removably secured to the body element, the same being fixedly positioned relative to the body element, by a nut 22 that is threadably secured to the underside of the shoulder shaft 21. A wearing plate 21A rests upon the body element and the shoulder shaft passes therethrough. A setting and feed disc rests upon the wearing plate 21A. The shoulder shaft also passes through the setting and feed disc 23. An alignment roller 24 is also disposed about the shoulder shaft and a washer 25 terminates the upper end of the alignment roller 24. A head 26 terminates the upper end of the shoulder shaft and locking spring clip 27 is disposed between the washer 25 and the head 26.

The assembly represented by numerals 21 to 26 is fixedly positioned relative to the body element and when it is desired to change the set and feed disc 23, the locking spring clip 27 is removed at which time the removable parts may be quickly changed to adapt the same to saws of different teeth, spacing and form.

A fixed base 28 is disposed within suitable guideways and engages the underside 29 of the body element 1. The guideway is formed by an elongated slot 30 disposed within the base 1 and a slide is formed by a guide bar 31. The sides 32 and 33 of the guide bar engages the side walls of the slot 30. The shoulder shaft 34 is threadably secured to the fixture base 28, with the shoulder 35 of the shoulder shaft engaging directly upon the guide bar 31 and compresses the two together.

An adjusting screw 36 is threadably secured to the ear 37. The adjusting screw passes through the side wall 3 of the body element and a collar 37A is disposed upon the adjusting screw 36 and engages the inner face of the side wall 3. The hub 38 of the adjusting knob 39 engages the outer face 40 of the side wall 3, so that the assembly secured to the adjustable base may be positioned through the adjusting action of the adjusting knob 39.

A set and feed disc 41 rests upon the guide bar 31 and the shoulder shaft 34 passes therethrough. A positioning roller 42 is disposed about the shoulder shaft 34 and a collar 43 terminates the upper end of the roller. A head 44 terminates the upper end of the shoulder shaft and the spring locking clip 45 is secured thereto. The saw, to be set, is engaged between the respective rollers 24 and 42 and is precisely positioned therebetween through the action of the positioning screw 36.

The teeth of the saw to be set are made to engage between the set and feeding discs and the teeth of the saw are forcibly made to engage the rollers 10 and 11 to maintain the saw in precise alignment.

Each of the setting and feeding discs have a series of sloping and setting teeth 46 disposed upon the outer periphery of the same which are made to engage the teeth to be set and which act as the swaging offset. The oppositely disposed disc has an inset 47 disposed adjacent thereto which acts as an anvil against which the swaging effect 46 is made to engage. This is best illustrated in Figs. 6 and 7. A feeding projection 48 is disposed adjacent the swaging and anvil receiving projections and recesses 46 and 47 which engage between the teeth and precisely position the tooth to be set, so that when the saw is pulled therebetween with the teeth engaging rollers 10 and 11 the saw will be precisely set by the pulling of the same through the device. A set of discs is provided for each shape and spacing of teeth required and the adjustable roller assembly is adjusted to precisely position the saw relative to the thickness of the blade forming the saw.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a body element having parallelly disposed side walls extending downwardly, supporting feet extending outwardly from the lower end of the side walls; said body element having a slot through a portion of its top and a pair of openings through its top, rollers rotatably disposed in spaced relationship within the body element, means for removably securing the rollers within the body element; a shoulder shaft removably secured to the body element, a set and feeding disc rotatably disposed upon the shoulder shaft, an alignment roller disposed about the shoulder shaft and superposed upon the set and feeding disc, a locking clip removably secured about the shoulder shaft and adapted for maintaining the disc and alignment roller in position; a fixture base slidably disposed within the slot, a guide bar for the fixture base, means for fixedly positioning the fixture base and guide bar relative to the body element, a second shoulder shaft threadedly secured to the fixture base, a second set and feeding disc rotatably mounted upon the second shoulder shaft and resting upon the guide bar; a second alignment roller superposed upon the second set and feeding disc and a second spring locking clip removably secured to the second shoulder shaft adapted for maintaining the second alignment roller and the second set and feeding disc in place upon the second shoulder shaft.

2. Apparatus as in claim 1 wherein the means for removably securing the rollers within the body element comprise a thimble having a hub extending outwardly therefrom about which a spring is placed.

WELBY V. HAWES.